（12）United States Patent
Raiser

(10) Patent No.: US 6,622,308 B1
(45) Date of Patent: Sep. 16, 2003

(54) AUTOMATIC DIGITAL TELEVISION (DTV) BYPASS FOR A CATV CONVERTER USING A CATV TUNER

(75) Inventor: James E. Raiser, Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/274,643

(22) Filed: Mar. 23, 1999

(51) Int. Cl.[7] .............................. H04N 7/16; H04N 5/46
(52) U.S. Cl. ...................... 725/151; 348/555; 348/731
(58) Field of Search .............................. 725/68, 70, 71, 725/89, 100, 131, 139, 151; 348/555, 731, 554, 706

(56) References Cited

U.S. PATENT DOCUMENTS

| 5,361,099 | A |   | 11/1994 | Kim ............................ 348/555 |
| 5,461,427 | A | * | 10/1995 | Duffield et al. ............. 348/555 |
| 5,557,337 | A | * | 9/1996 | Scarpa ........................ 348/555 |
| 5,572,264 | A |   | 11/1996 | Mizukami et al. |
| 5,636,252 | A |   | 6/1997 | Patel et al. .................. 375/345 |
| 5,638,112 | A | * | 6/1997 | Bestler et al. ............... 725/131 |
| 5,896,557 | A | * | 4/1999 | Suzuki et al. ............... 725/139 |
| 5,982,457 | A |   | 11/1999 | Limberg |
| 6,005,640 | A | * | 12/1999 | Strolle et al. ............... 348/555 |
| 6,108,044 | A | * | 8/2000 | Shin ........................... 348/555 |
| 6,226,794 | B1 | * | 5/2001 | Anderson et al. .......... 725/131 |
| 6,335,762 | B1 | * | 1/2002 | Lee ............................ 348/555 |
| 6,369,857 | B1 | * | 4/2002 | Balaban et al. ............ 348/555 |
| 6,377,316 | B1 | * | 4/2002 | Mycynek et al. ........... 348/731 |
| 6,380,983 | B1 | * | 4/2002 | Miyazaki et al. ........... 348/554 |
| 6,441,860 | B1 | * | 8/2002 | Yamaguchi et al. ........ 348/555 |
| 6,483,553 | B1 | * | 11/2002 | Jung .......................... 348/731 |

FOREIGN PATENT DOCUMENTS

WO    WO 98/12874    3/1998

* cited by examiner

Primary Examiner—John Miller
Assistant Examiner—Scott Beliveau
(74) Attorney, Agent, or Firm—Kenneth M. Massaroni; Hubert J. Barnhardt, III; Shelley L. Couturier

(57) ABSTRACT

A cable converter box is a capable of receiving a cable signal that includes both NTSC and digital television (DTV) formatted signals. When the converter box is tuned to a channel, the converter box determines whether the channel carries an NTSC or DTV signal. If the signal is NTSC, the signal passes through an up/down converter, is demodulated in a conventional manner, and is remodulated in order to be provided to the TV on a pre-selected channel. If the signal is DTV, the signal passes through the up/down converter, but not through the demodulator, prior to being output to a DTV-compatible TV on the same pre-selected channel as the NTSC signal. This prevents the user from having to change the tuner on the TV when the cable converter is changed to a DTV channel.

17 Claims, 3 Drawing Sheets

US 6,622,308 B1

AUTOMATIC DIGITAL TELEVISION (DTV) BYPASS FOR A CATV CONVERTER USING A CATV TUNER

TECHNICAL FIELD

The present invention generally relates to cable television system converter boxes, and more particularly relates to converter boxes that receive both NTSC and digital television signals.

BACKGROUND

Converter boxes, or set top boxes, have long been associated with the reception of cable television programs. In the early years of cable TV, when television sets were capable of receiving only a relatively small number of VHF and UHF channels, converter boxes were needed to receive the large number of channels provided by the cable system and translate them to one of the channels that could be received by the television sets. In most cases, the converter box would demodulate the signal from its original carrier frequency, process the signal, and remodulate it so it could be provided to the television set on channel 2, 3, or 4. Because the converter box outputs the TV signals on a single, selectable channel, such as channel 2, 3, or 4, the user changed channels with the converter box and did not need to change channels on the TV set.

Eventually, television manufacturers produced "cable-ready" television sets. These cable-ready TVs could be connected directly to the cable system because their tuners were capable of receiving and demodulating all of the channels provided by the cable TV system. Cable customers with cable-ready TV sets no longer needed cable converters in order to receive basic cable programming.

Subsequent generations of converter boxes have been employed as cable TV companies have continued to offer a variety of new services, such as pay-per-view (PPV) and other premium channels and services. These newer converter boxes were needed to descramble scrambled channels and to provide internet services, program guides, and the like.

Digital television (DTV) refers to television signals that have been encoded and compressed. Currently, High Definition Television (HDTV) is the most common form of digital television signal being contemplated or provided by cable TV companies. In cable TV systems that provide HDTV signals, the HDTV signals are included in the channel lineup along with the NTSC signals. HDTV signals cannot be demodulated by converter boxes with demodulators that are designed for conventional NTSC signals. Therefore, the HDTV signals need to be provided to an HDTV-compatible TV set, or to an HDTV-to-NTSC converter, which converts the HDTV signal to NTSC format and provides the NTSC signal to the NTSC TV set.

In order for the HDTV signals to get to the HDTV-compatible TV set or to the HDTV-to-NTSC converter, the HDTV signals must, in effect, bypass the cable converter. This may be accomplished with a manually controlled switch that is external to the converter box. However, requiring a cable customer to adjust a manual switch whenever an HDTV channel is selected is quite inconvenient for the customer. A more convenient solution is a relay-controlled bypass switch, which automatically bypasses the converter when an HDTV channel is selected.

The problem with either of these bypass solutions is that when they are in the bypass mode, the HDTV signal provided to the HDTV-compatible TV set or the HDTV-to-NTSC converter is at the carrier frequency it was transmitted from the cable headend. This requires the receiver in the TV or HDTV-to-NTSC converter to be tuned to the carrier frequency of the HDTV channel, and then switched back to the selectable channel (e.g., channel 2, 3, or 4) when the customer tunes the converter box to an NTSC channel.

In order to avoid requiring the customer to select different channels on an HDTV-compatible TV set or HDTV-to-NTSC converter, there is a need in the art for a converter box that is capable of automatically passing the DTV signals through the converter and outputting them on the same selectable channel that is used for the NTSC channels.

SUMMARY

The present invention satisfies the above-described need by providing a system and method for receiving a cable television signal having a plurality of channels and for providing a selected one of the plurality of channels on an output channel. The cable television signal includes a plurality of channels, which include at least one channel in a first signal format and at least one channel in a second signal format. If the selected channel is in the first signal format, the selected channel is converted to an output frequency corresponding to the output channel and output in the first signal format at the output frequency. If the selected channel is in the second signal format, the selected channel is converted to an intermediate frequency, demodulated, modulated to a frequency corresponding to the output channel, and output on the output channel.

DETAILED DESCRIPTION

The present invention provides an improved cable converter box that is capable of receiving both NTSC and DTV signals and providing the selected channel, whether NTSC or DTV, to a DTV-compatible TV or DTV-to-NTSC converter on the same selectable channel (e.g., channel 2, 3, or 4). This avoids the need for the user to separately switch the TV or DTV-to-NTSC converter to a different channel when the user tunes the cable converter box to a DTV channel.

Figure 1:
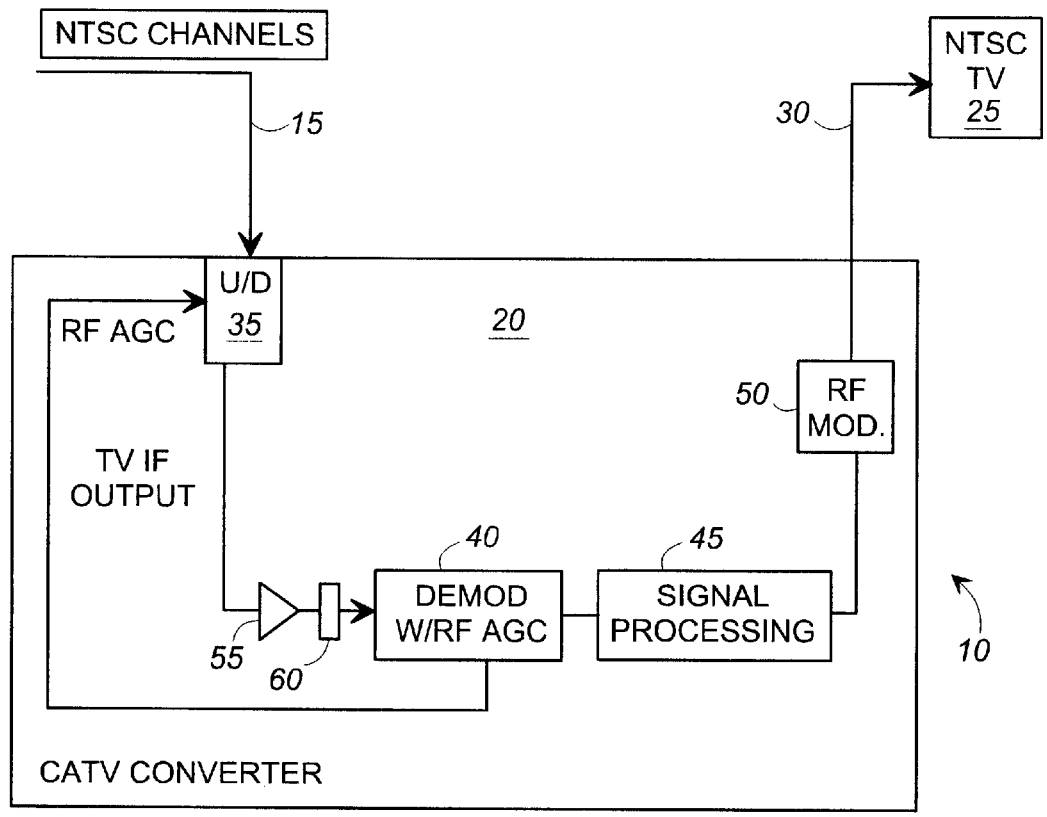
FIG. 1 is a block diagram illustrating the relationship between a conventional NTSC cable converter box, its principle components, and a conventional NTSC TV.
Figure 2:
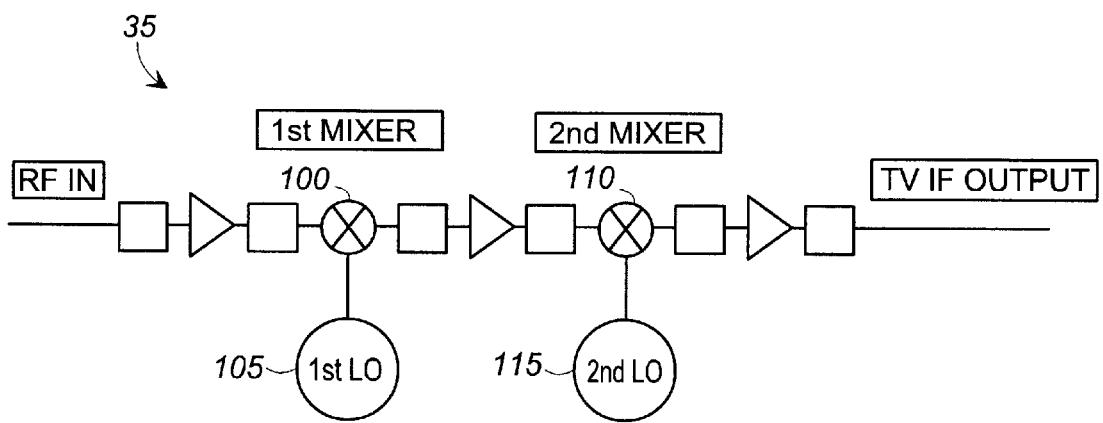
FIG. 2 is a block diagram illustrating the up/down converter section of the NTSC cable converter box of FIG. 1.
Figure 3:
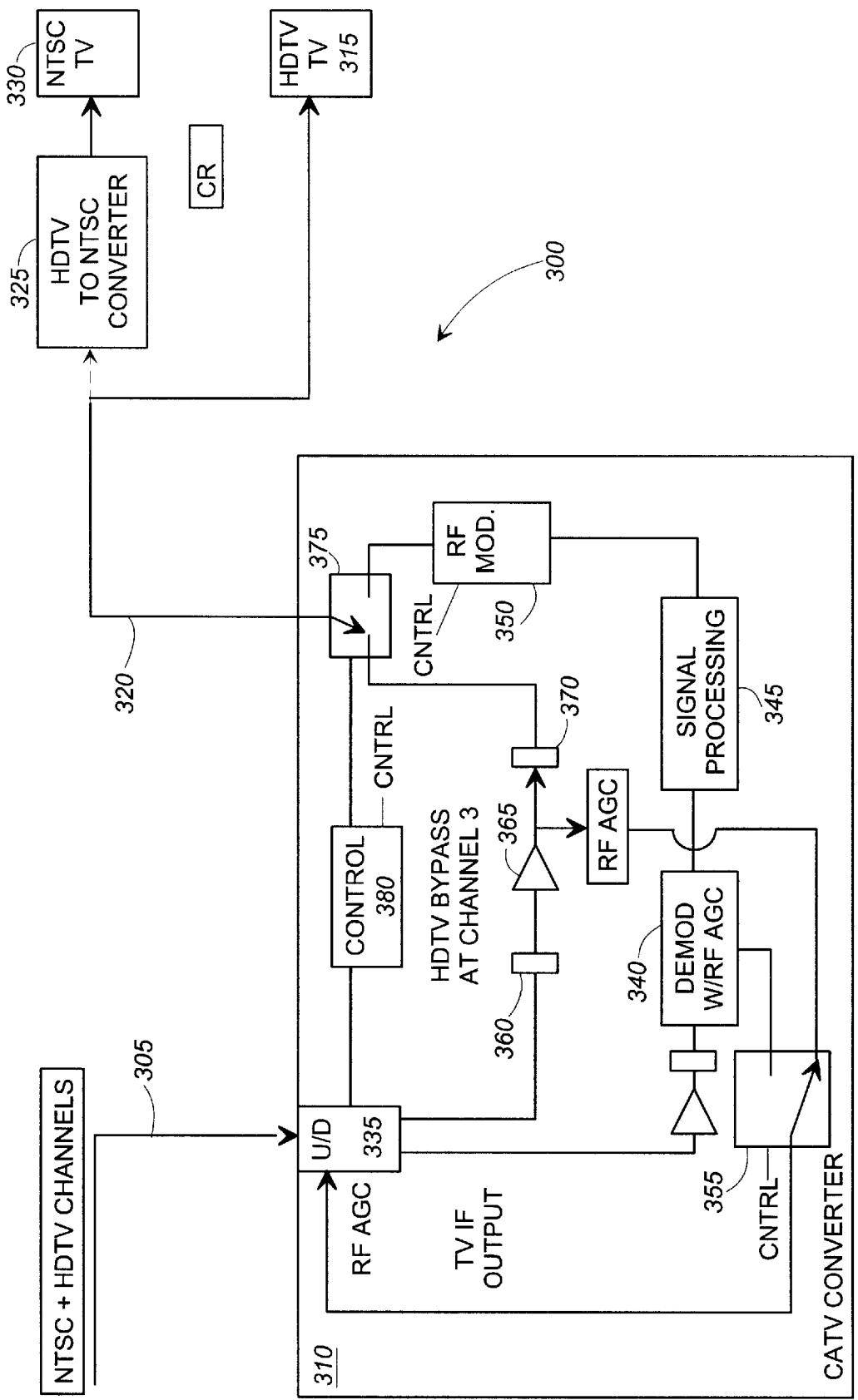
FIG. 3 is a block diagram illustrating the relationship between a cable converter box with HDTV bypass and an HDTV-compatible TV or HDTV-to-NTSC converter and NTSC TV.
Figure 4:
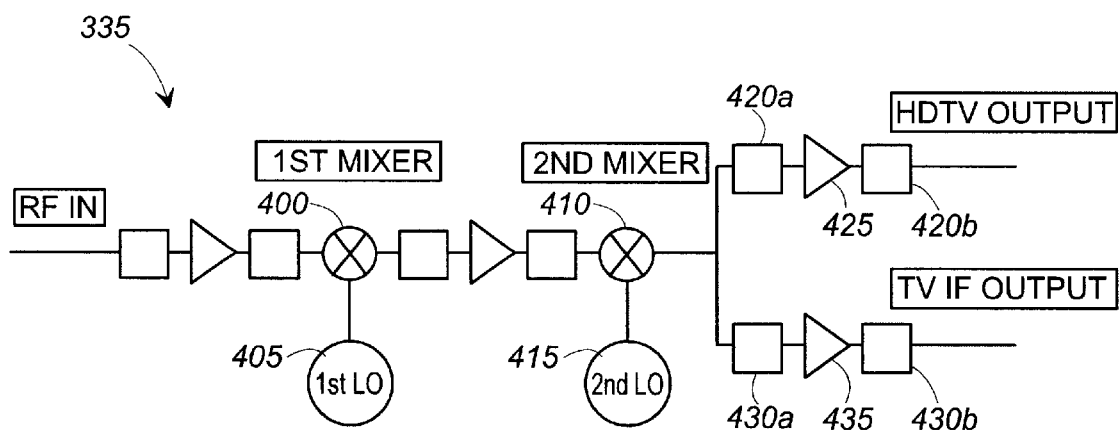
FIG. 4 is a block diagram illustrating the up/down converter section of cable converter box of FIG. 3.

An exemplary embodiment of a cable converter box according to the present invention is illustrated in FIGS. 3 and 4. However, before discussing the components and operation of an HDTV-compatible converter box, it is helpful to describe the operation of a conventional NTSC cable converter box, which is illustrated in FIGS. 1 and 2. HDTV was chosen for the exemplary embodiment because, currently, it is the most common form of DTV signal. However, those skilled in the art will appreciate that the principles of the present invention are equally applicable to other types of digital television signals.

CONVENTIONAL NTSC CABLE DECODERS

FIG. 1 illustrates relevant features of the subscriber portion 10 of a conventional NTSC cable television system, which is found at a subscriber's premises. The subscriber portion 10 includes a coaxial cable 15, which carries a large number of modulated NTSC TV signals from the cable headend. The coaxial cable 15 is connected to an NTSC converter box 20. The user selects a channel by tuning the NTSC converter box 20 to the desired channel. The demodulated NTSC TV signal for that channel is provided to a TV set 25 via coaxial cable 30.

Still referring to FIG. 1, the NTSC cable converter 20 includes an up/down converter 35, a demodulator 40, a signal processor 45, and a selectable channel RF modulator 50. The demodulator 40 includes an RF automatic gain control (AGC) signal that is fed back to the up/down converter 35.

FIG. 2 illustrates the components that form a part of the up/down converter 35. For purposes of the present discussion, the primary components of the up/down converter 35 are the first mixer 100, which is connected to the first local oscillator 105, and the second mixer 110, which is connected to the second local oscillator 115. The up/down converter 35 also includes a variety of filters (represented by squares) and amplifiers (represented by triangles).

The operation of the NTSC converter box 20 will now be described with reference to the elements of FIGS. 1 and 2. The up/down converter 35, which is also known as a dual conversion tuner, has two mixer stages. The first mixer 100 mixes the desired input channel up to a first intermediate frequency (IF). This first IF will be above the frequency of the highest channel tuned by the NTSC cable converter 20. At the second mixer 110, the first IF is mixed down to what is called TV IF. Mixing the signal to TV IF places an NTSC picture carrier at 45.75 MHz and the aural carrier at 41.25 MHz. Mixing the first IF down to 45.75 MHz for the picture carrier and 41.25 MHz for the aural carrier is advantageous because it allows the use of components that are widely used in the TV industry, readily available, and which are low cost due to their high volumes.

The first local oscillator 105 for the first mixer 100 is higher in frequency than the first IF. This causes the signals frequency spectrum to be inverted. For an NTSC signal, the picture carrier is now higher in frequency than the aural carrier. The second local oscillator 115 for the second mixer 110 is lower in frequency than the first IF in order to prevent the second mixer 110 from inverting the frequency spectrum once again. In most cases, the first local oscillator 105 is controlled by a phase lock loop (PLL). The second local oscillator 115 is normally controlled by an automatic frequency control (AFC) circuit, although PLLs are also being used for this purpose.

The output of the second mixer 110 goes through an amplifier, which may have pre-filtering and post-filtering to attenuate adjacent channels or any other undesired signals as needed. At this point, the TV IF signal exits the up/down converter 35 and may go through a gain stage 55 and a Nyquist slope filter 60 before entering the NTSC video demodulator 40. The output of the NTSC video demodulator 40 is base band video. The base band video is then passed to the signal processor 45, where the signal may be processed if necessary, or simply allowed to pass to the RF modulator 50. The processing performed by the signal processor 45 can include descrambling the signal, adding on-screen display information, and the like. The RF modulator 50 amplitude modulates the signal to a carrier at a selectable channel, such as channel 2, 3, or 4, for input to the user's TV set.

The aural carrier at TV IF is also output from the up/down converter 35 and goes through the gain stage 55 and filter 60.

The aural carrier typically gets mixed down to 4.5 MHz and frequency demodulated to base band. The aural signal is then processed as needed by the signal processor 45 and fed to the RF modulator 50, which frequency modulates a 4.5 MHz carrier and mixes it with the video carrier at the selectable channel.

AN IMPROVED CABLE CONVERTER WITH AUTOMATIC DTV BYPASS

FIGS. 3 and 4 illustrate an embodiment of the invention that is designed to work in a cable system that transmits both NTSC and HDTV signals. As mentioned above, HDTV is currently the most common form of DTV signal, but the principles of the present invention also apply to other types of digital television signals.

FIG. 3 illustrates relevant features of the subscriber portion 300 of a cable television system that provides both NTSC and HDTV signals. The subscriber portion 300 of the system includes a coaxial cable 305, which carries a large number of modulated NTSC TV signals and HDTV signals from the cable headend. The coaxial cable 305 is connected to an HDTV/NTSC converter box 310, which embodies the present invention. The user selects an NTSC or HDTV channel by tuning the HDTV/NTSC converter box 310 to the desired channel. This is typically accomplished by using a wireless remote control. The NTSC TV signal or HDTV signal on the selected channel is then provided to an HDTV-compatible TV set 315 via coaxial cable 320, or to an HDTV-to-NTSC converter 325, which is connected to an NTSC TV 330.

Many components of the HDTV/NTSC converter box 310 are similar to those found in the NTSC converter box 20 of FIG. 1. The HDTV/NTSC cable converter 310 includes an up/down converter 335, a demodulator 340, a signal processor 345, and a selectable channel RF modulator 350. The demodulator 340 includes an RF automatic gain control (AGC) signal that may be fed back to the up/down converter 335 through AGC selector switch 355. These components operate to process NTSC signals in the same manner as the components described in conjunction with the NTSC converter box 20 of FIGS. 1 and 2. In addition to these components, the HDTV/NTSC converter box 310 includes an HDTV filter 360, an HDTV amplifier 365, another HDTV filter 370, a switch 375 for selecting between the HDTV path and the NTSC path, and a control circuit 380.

FIG. 4 illustrates the components that form a part of the up/down converter 335. For purposes of the present discussion, the primary components of the up/down converter 335 are the first mixer 400, which is connected to the first local oscillator 405, and the second mixer 410, which is connected to the second local oscillator 415. The up/down converter 335 also includes a variety of filters (represented by squares) and amplifiers (represented by triangles). After the signal is output from the second mixer 410, HDTV signals are passed through one set of filters 420a, 420b and an amplifier 425, while NTSC signals are passed through a second set of filters 430a, 430b and an amplifier 435.

In order to process an HDTV signal or other non-NTSC signal, the HDTV/NTSC converter box 310 needs to know which channels carry the HDTV signals. This can be accomplished by storing in memory (not shown) the type of signal carried on each channel, or by testing the tuned signal to determine if it has the characteristics of an NTSC signal or an HDTV signal. For example, the converter box can determine that the selected channel carries an NTSC signal if the converter box detects the presence of horizontal or vertical synchronization pulses.

When the HDTV/NTSC converter box 310 is tuned to a channel that carries an HDTV signal, the second local oscillator 415 tunes to a frequency equal to the first IF plus the desired output frequency instead of to a frequency equal to the first IF minus 45.75 MHz. In this case, the desired output frequency corresponds to the selected output channel (e.g., channel 2, 3, or 4). With the second local oscillator 415 being above the first IF, the frequency spectrum is inverted for a second time, which results in the spectrum having the same sense as the signal input into the converter box 310. If the HDTV signal being bypassed is QAM and the HDTV-compatible TV set or HDTV-to-NTSC converter can process inverted data, the second local oscillator 415 can be tuned a frequency equal to the first IF minus the desired output frequency. Although the output spectrum, and the data received by the QAM demodulator, will be inverted in this case, the inverted data can be handled in the QAM demodulator's software. Being able to use a "low side" local oscillator means that the second local oscillator's tuning range between NTSC and HDTV is reduced, which results in the ability to use less expensive parts.

The output of the second mixer 410 now goes through a different path from the TV IF path used for NTSC signals. The HDTV path, which includes filters 420a, 420b and amplifier 425, filters and amplifies the signal as required for an HDTV signal. The signal then leaves the up/down converter 335 at the desired output frequency, which corresponds to the desired output channel. For example, if the desired output channel is channel 3, the video carrier is at 61.25 MHz and the aural carrier is at 65.75 MHz.

The signal may need additional amplification with pre-filtering and post-filtering after it leaves the up/down converter 335. This is provided by the HDTV filter 360, HDTV amplifier 36, and HDTV filter 370. After the signal is filtered and amplified, it goes to the switch 375, which, in HDTV mode, will select this signal and route it to the output of the HDTV/NTSC converter box 310. When NTSC signals are received, the RF output switch 375 routes the output of the RF modulator 350 to the output of the HDTV/NTSC converter box 310.

When outputting an HDTV signal, the RF modulator can be turned off in order to prevent interference from the RF modulator 350 to the HDTV output. Alternatively, if the RF modulator 350 is a dual channel modulator, it can be switched to the second output frequency if the video is also blanked. This will prevent interference from the RF modulator 350 to the HDTV output if the RF modulator were left on the same frequency.

Those skilled in the art will appreciate that the converter box 310 includes a variety of additional components that are not illustrated in FIG. 3. For example, the converter box 310 includes a microprocessor, RAM, ROM, a display, an infrared receiver for receiving signals from a remote control, etc. This may form a part of the control circuit 380. In an exemplary embodiment of the present invention, the AGC selector switch 355 and the RF output switch 375 are controlled by the control circuit 380 in response to the determination that the signal on the tuned channel is in NTSC format or HDTV format. Similarly, the frequency of the second local oscillator 415 in the up/down converter 335, which outputs NTSC signals at TV IF and HDTV signals at the frequency of the desired output channel, is controlled by the control circuit 380.

From the foregoing description, it will be appreciated that the present invention provides an apparatus for receiving a cable television signal that includes signals with two different formats, such as NTSC and DTV, and for providing the selected output signal on a predetermined, selectable channel. In the embodiment described above, this prevents the user from having to tune an HDTV-compatible TV or HDTV-to-NTSC converter to an HDTV channel when the converter box is tuned to an HDTV channel.

The present invention has been described in relation to particular embodiments, which are intended in all respects to be illustrative rather than restrictive. For example, although the present invention has been described in the context of a converter box that receives NTSC and HDTV signals, those skilled in the art will appreciate that the present invention may be employed in a converter box that receives other types of digital television signals, or signals that are modulated by other techniques, such as QAM or Vestigial Sideband (VSB) modulation. Similarly, although some digital set top terminals are capable of demodulating and processing NTSC and QAM signals, the present invention may be employed in those terminals to provide an automatic bypass for television signals in formats that cannot be processed, such as, for example, VSB.

Alternative embodiments will be apparent to those skilled in the art to which the present invention pertains without departing from its spirit or scope. Accordingly, the scope of the present invention is defined by the appended claims rather than the foregoing description.

What is claimed is:

1. A method for receiving a cable television signal having a plurality of channels and for providing a selected one of the plurality of channels on an output channel, the method comprising the steps of:

receiving the cable television signal including the plurality of channels, the plurality of channels including at least one channel in a digital signal format and at least one channel in an analog signal format;

receiving a user input indicating the selection of one of the plurality of channels in the cable television signal;

determining whether the selected channel is in the digital signal format or the analog signal format;

if the selected channel is in the digital signal format,
        converting the selected channel to an output frequency corresponding to the output channel; and
        outputting the selected channel at the output frequency in the digital signal format; and if the selected channel is in the analog signal format,
        converting the selected channel to an intermediate frequency;
        demodulating the selected channel;
        modulating the selected channel to a frequency corresponding to the output channel; and
        outputting the selected channel on the output channel.

2. The method of claim 1, wherein the digital signal format comprises HDTV format.

3. The method of claim 1, further comprising the step of processing the demodulated selected channel if the selected channel is in the analog signal format.

4. The method of claim 3, wherein processing the demodulated selected channel includes descrambling the demodulated selected channel.

5. The method of claim 1, wherein determining whether the selected channel is in the digital signal format or the analog signal format comprises the step of determining whether the selected channel has been identified as a channel that carries a digital signal or an analog signal.

6. The method of claim 1, wherein determining whether the selected channel is in the digital signal format or the analog signal format comprises the step of evaluating the characteristics of the signal on the selected channel.

7. A cable converter for receiving a cable television signal having a plurality of channels and for providing a selected one of the plurality of channels on an output channel, comprising:
   a first input for receiving a cable television signal, the cable television signal including at least one channel including a digital format signal and at least one channel including an analog format signal;
   a second input for receiving a user input indicating the selection of one of the plurality of channels in the cable television signal;
   control circuitry for determining whether the selected channel is in the digital signal format or the analog signal format;
   a converter for converting the selected channel to an output frequency corresponding to the output channel if the selected channel is in the digital signal format and for converting the selected channel to an intermediate frequency if the selected channel is in the analog signal format;
   a demodulator operative connected to the converter for demodulating the selected channel if the selected channel is in the analog signal format;
   an RF modulator for modulating the second channel to the output channel if the selected channel is in the analog signal format; and
   a switch, responsive to the control circuit, for controlling the output of the cable converter and for outputting the selected channel on the output frequency in the digital signal format if the selected channel is in the digital signal format and for outputting the RF modulated signal if the selected channel is in the analog signal format.

8. The cable converter of claim 7, wherein the digital signal format is a DTV signal using VSB modulation and the analog signal format is an HDTV signal using QAM modulation or an NTSC signal.

9. The cable converter of claim 7, further comprising a signal processor connected between the demodulator and the RF modulator for processing the demodulated signal.

10. The cable converter of claim 7, wherein the signal processor descrambles the demodulated selected channel.

11. The cable converter of claim 7, wherein the control circuit is operative to determine whether the selected channel is in the digital signal format or the analog signal format by detecting characteristics of the selected channel.

12. The cable converter of claim 7, wherein the control circuit is operative to determine whether the selected channel is in the digital signal format or the analog signal format by determining whether the selected channel has been identified as carrying one of a digital signal and an analog signal.

13. A cable converter for receiving a cable television signal having a plurality of channels and for providing a selected one of the plurality of channels on an output channel, comprising:
   a first input for receiving a cable television signal, the cable television signal including at least one channel including an NTSC signal and at least one channel including a digital TV signal;
   a second input for receiving a user input indicating the selection of one of the plurality of channels in the cable television signal;
   a control circuit for determining whether the selected channel is an NTSC signal or a digital TV signal;
   an up/down converter operative to
      convert the selected channel to an output frequency corresponding to the output channel as a digital TV signal if the selected channel is a digital TV signal, or
      convert the selected channel to an intermediate frequency if the selected channel is an NTSC signal;
   a demodulator for receiving the selected NTSC signal from the up/down converter and for demodulating the selected NTSC signal;
   a signal processor for processing the demodulated NTSC signal;
   an RF modulator for modulating the processed NTSC signal to a frequency corresponding to the output channel; and
   a switch for selecting the modulated NTSC signal if the selected channel is an NTSC signal and for selecting the up/down converted digital TV signal if the selected channel is a digital TV signal.

14. The cable converter of claim 13, wherein a digital TV signal comprises an HDTV signal.

15. The cable converter of claim 13, wherein processing the demodulated NTSC signal includes descrambling the demodulated NTSC signal.

16. The cable converter of claim 13, wherein the control circuit is operative to determine whether the selected channel is an NTSC signal by detecting horizontal sync signals or vertical sync signals in the selected channel.

17. The cable converter of claim 13, wherein the control circuit is operative to determine whether the selected channel is an NTSC signal or a digital TV signal by determining whether the selected channel has been identified as carrying an NTSC signal or a digital TV signal.

* * * * *

UNITED STATES PATENT AND TRADEMARK OFFICE
CERTIFICATE OF CORRECTION

PATENT NO. : 6,622,308 B1
DATED : September 16, 2003
INVENTOR(S) : Raiser

It is certified that error appears in the above-identified patent and that said Letters Patent is hereby corrected as shown below:

Column 6,
Line 42, insert -- up/down -- before "converting"
Line 45, insert -- without demodulation -- before "format" and ","

Column 7,
Line 18, delete "a converter" and insert therefore -- an up/down converter --
Line 24, delete "operative" between "demodulator" and "connected"
Line 24, insert -- up/down -- between "the" and "converter"
Line 27, delete "second" and insert therefore -- selected --
Line 33, insert "without demodulation" between "format" and "if"

Column 8,
Line 35, insert -- without demodulation -- between "signal" and "if"

Signed and Sealed this

Fifth Day of April, 2005

JON W. DUDAS
*Director of the United States Patent and Trademark Office*